US008678938B2

(12) United States Patent
Schmidt et al.

(10) Patent No.: US 8,678,938 B2
(45) Date of Patent: Mar. 25, 2014

(54) LUBRICATED ENGINE COMPENSATOR ASSEMBLY AND MOTORCYCLE HAVING THE SAME

(75) Inventors: Rick A. Schmidt, Menomonee Falls, WI (US); Karl W. Monis, Rubicon, WI (US); Alfredo Cartes, Jr., West Allis, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 0 days.

(21) Appl. No.: 13/562,775

(22) Filed: Jul. 31, 2012

(65) Prior Publication Data
US 2014/0034404 A1 Feb. 6, 2014

(51) Int. Cl.
*F16D 3/10* (2006.01)
(52) U.S. Cl.
USPC ........... 464/161; 464/38; 180/219; 123/192.1
(58) Field of Classification Search
USPC ................... 464/161, 38; 180/219; 123/192.1
See application file for complete search history.

(56) References Cited

U.S. PATENT DOCUMENTS

| | | | |
|---|---|---|---|
| 2,152,710 A | 4/1939 | Schwaiger | |
| 2,859,598 A | 11/1958 | Hochreuter | |
| 2,939,300 A | 6/1960 | Lucia | |
| 3,159,987 A | 12/1964 | Thompson et al. | |
| 5,092,292 A | 3/1992 | Iguchi et al. | |
| 5,341,780 A | 8/1994 | Rau et al. | |
| 5,640,935 A | 6/1997 | Ishihara | |
| 6,234,909 B1 | 5/2001 | Yetzke | |
| 6,688,986 B2 | 2/2004 | Hojyo et al. | |
| 6,702,681 B1 | 3/2004 | Ochs | |
| 7,143,734 B1 | 12/2006 | Leppanen et al. | |
| 7,682,255 B2 | 3/2010 | Monis et al. | |
| 8,016,684 B2 * | 9/2011 | Ruscak | 464/1 |
| 2009/0205919 A1 | 8/2009 | Cho et al. | |
| 2010/0304907 A1 | 12/2010 | Yuan | |

* cited by examiner

*Primary Examiner* — Kevin Hurley
(74) *Attorney, Agent, or Firm* — Michael Best & Friedrich LLP

(57) ABSTRACT

The present invention provides a compensator assembly for use in a motorcycle. The compensator assembly includes an input member, and an output member driven by the input member through a torque-buffering interface. The compensator assembly also includes one or more lubrication passageways formed therein extending between a distal end and one or more interfaces to provide lubricant thereto.

26 Claims, 11 Drawing Sheets

LUBRICATED ENGINE COMPENSATOR ASSEMBLY AND MOTORCYCLE HAVING THE SAME

FIELD OF THE INVENTION

The present invention relates to a lubricated compensator assembly for use on a motorcycle to dampen impulses in the drivetrain.

BACKGROUND OF THE INVENTION

Motorcycles typically include a compensator assembly within the drivetrain to dampen the impulse loads between the engine and the rear wheels. The impulse loads can be the result of natural engine torque spikes or abrupt road forces applied to the rear wheel. Some such compensator assemblies are mounted on the crankshaft of the engine and transmit torque to a clutch at a transmission input via a drive chain, gear set, belt, and the like. As such, the compensator assembly generally includes various moving parts that can, over time, wear and break down.

To limit the wear and tear on the compensator assembly, some designs utilize the pressurized oil or lubricant provided by the engine lubrication system. Other compensator designs rely on splash lubrication within the primary cover of the motorcycle. Still other compensator designs are not lubricated at all.

SUMMARY OF THE INVENTION

In some embodiments, the present invention provides a motorcycle having a frame, a rear wheel rotatably coupled to the frame, an engine supported by the frame and configured to drive the rear wheel the engine having a crankshaft, and a compensator assembly coupled between the crankshaft and the rear wheel to dampen impulse loads between the crankshaft and the rear wheel. The compensator assembly has a shaft extension rotatably fixed with respect to the crankshaft, an input member rotatably fixed and axially slideable with respect to the shaft extension forming a first interface therebetween, an output member driven by the input member with a torque-buffering interface, a retainer rotatably fixed to the crankshaft and configured to axially retain the input member and the output member thereto. The retainer and output member are rotatably coupled to one another forming a second interface therebetween. The retainer includes a passageway extending between a distal end of the retainer and at least one of the first interface and the second interface.

In another embodiment, the present invention provides a compensator assembly for transmitting torque along a drivetrain having at least one shaft therein. The compensator assembly having an input member rotationally fixed to and axially moveable with respect to the shaft along a first interface, an output member driven by the input member with a torque-buffering interface, and a retainer mounted to the crankshaft and configured to retain the input member and output member thereto. The retainer and output member being rotatably coupled to one another to form a second interface therebetween, and where the retainer defines at least one passageway extending between a distal end of the retainer and at least one of the first interface and the second interface.

In still another embodiment, the present invention provides a motorcycle having a frame, a rear wheel rotatably coupled to the frame, an engine supported by the frame and configured to drive the rear wheel, the engine having a crankshaft defining a crankshaft axis, and a compensator assembly to dampen impulse loads between the crankshaft and the rear wheel. The compensator assembly includes a shaft extension rotatably fixed with respect to the crankshaft, an input member rotatably fixed and axially slideable with respect to the shaft extension to form a first interface therebetween, an output member driven by the input member with a torque-buffering interface, and a retainer rotatably fixed to the crankshaft. The retainer and input member being rotatably coupled to one another forming a second interface therebetween. Where the distal end of the retainer defines a pocket, and where the retainer includes a passageway extending and in fluid communication with the pocket and at least one of the first interface and the second interface. The compensator assembly also includes a retention bolt coupling the retainer to the crankshaft, the retention bolt having a head portion with a substantially conical outer surface, and where at least a portion of the conical outer surface is positioned within the pocket. The motorcycle also has a cover at least partially encompassing the compensator assembly therein, the cover having a plurality of ribs forming an apex that is vertically aligned with the crankshaft axis.

Other aspects of the invention will become apparent by consideration of the detailed description and accompanying drawings.

DETAILED DESCRIPTION

Figure 1:
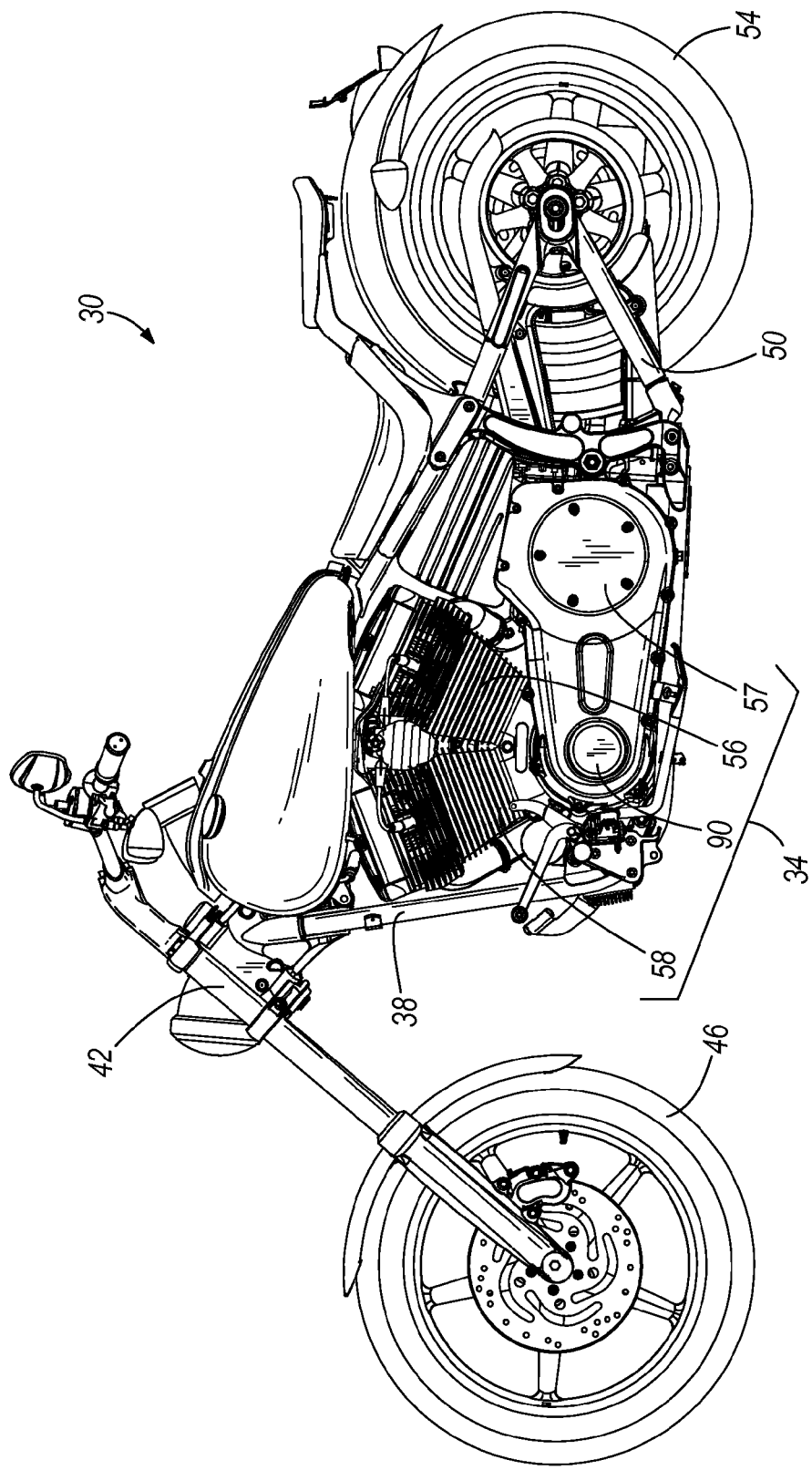
FIG. 1 is a side view of a motorcycle including a drivetrain embodying the present invention.

It is to be understood that the invention is not limited in its application to the details of construction and the arrangements of the components set forth in the following description or embodiments, or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates a motorcycle 30 including a drive assembly 34. The motorcycle 30 includes a frame 38, a steering assembly 42 pivotally coupled to a forward portion of the frame 38, and a front wheel 46 rotatably coupled to the steering assembly 42. The frame 38 also includes a swingarm portion 50 moveable with respect to the remainder of the frame 38. A rear wheel 54 is rotatably coupled to the swingarm 50. An engine 56 (e.g., a V-twin internal combustion engine) of the drive assembly 34 provides power and torque to drive the rear wheel 54 through a drivetrain including a primary drive, a clutched transmission, and a final drive as discussed in further detail below. Although illustrated with two wheels, in alternate constructions the motorcycle may include a three wheel design.

Figure 2:
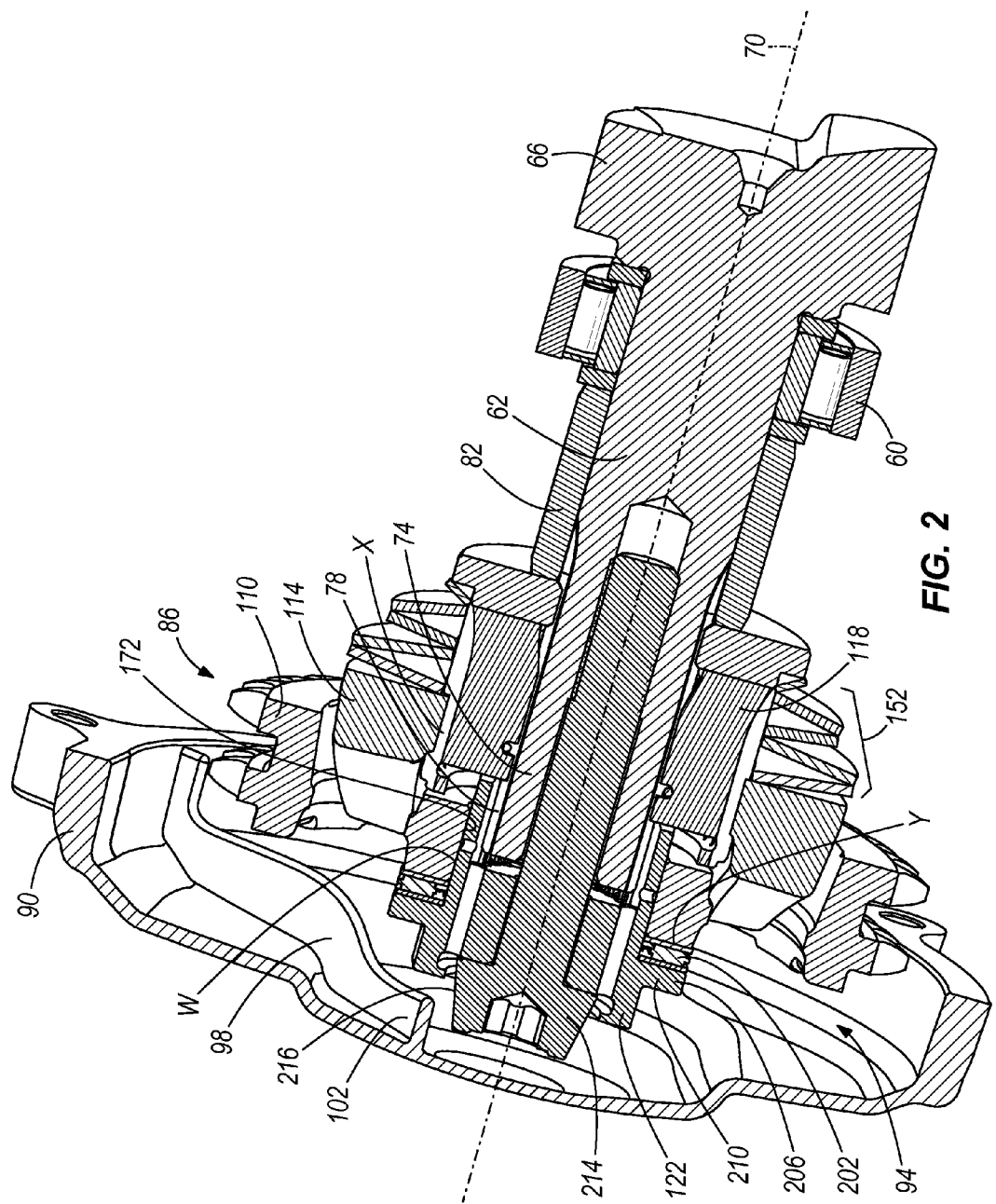
FIG. 2 is a section view taken along the crankshaft axis illustrating the compensator assembly of the present invention.

The engine 56 includes a crankcase 58 (FIG. 1), which supports a crankshaft 62 and a flywheel 66 for rotation about a crankshaft axis 70 (FIG. 2). The crankshaft 62 extends outwardly from the crankcase 58 to form a distal end 74 having one or more spline teeth 78 thereon. When assembled, the crankshaft 62 is supported for rotation relative to the crankcase by one or more bearings 60. A spacer 82 abuts the bearing 60 and positions a compensator assembly 86 proximate the distal end 74 of the crankshaft 62. Although not shown, the engine 56 also includes a lubrication system providing lubricant or oil to various elements within the engine. More specifically, the engine lubrication system draws oil from within the crankcase 58 and pumps it, under pressure, to various locations throughout the engine 56.

Figure 3:
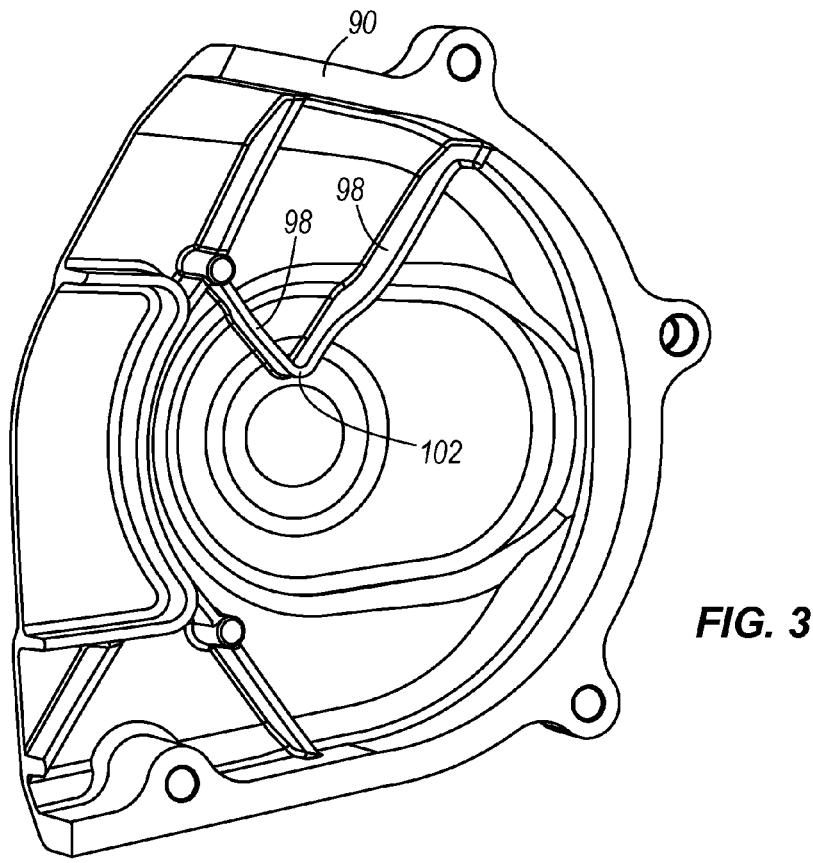
FIG. 3 is illustrates the interior or the primary cover of the motorcycle shown in FIG. 1.

The drive assembly 34 also includes a primary cover 90 (FIGS. 1-3) coupled to the crankcase 58 of the engine 56 to define a primary chamber 94 therebetween. The primary chamber 94 at least partially encloses the compensator assembly 86 and a quantity of oil, separate from the oil of the engine lubrication system. The primary cover 90 typically forms a seal with the crankcase 58 to prevent the oil from leaking. The primary cover 90 may also be removed to allow access to the primary chamber 94 for maintenance and the like.

The primary cover 90 also includes a pair of vanes or ribs 98 (FIG. 3) extending into the chamber 94 to form a "V" shape. When assembled, the apex 102 of the ribs 98 (e.g., the point of the "V") is positioned slightly above and vertically aligned with the crankshaft axis 70. During use, the ribs 98 collect a quantity of the splash oil within the chamber 94 and funnel it towards the apex 102 which in turn directs the oil onto the retaining bolt 106 of the compensator assembly 86 (described below). The shape and positioning of the ribs 98 are configured to maximize the volume of oil directed onto the compensator assembly 86.

Illustrated in FIGS. 2-12, the compensator assembly 86 is configured to dampen impulse loads within the drivetrain of the motorcycle. More specifically, the compensator assembly 86 is coupled for rotation with the crankshaft 62 and operates to dampen impulse loads between the engine 56 and the rear wheel 54. The compensator assembly 86 includes an output member or sprocket 110, an input member or cam slider 114, a shaft extension 118, and a retention assembly 122. In addition to transmitting torque, the compensator assembly 86 of the present invention is designed to provide oil to various interfaces within the device independent the lubrication system of the engine 56. Stated differently, the compensator assembly 86 collects oil from within the primary cover 90 (e.g., via the ribs 98) and directs it by way of oil passageways to one or more interfaces within the compensator assembly 86. In the present description, an interface is defined as any area of the compensator where two or more surfaces slide with respect to one another.

Figure 4:
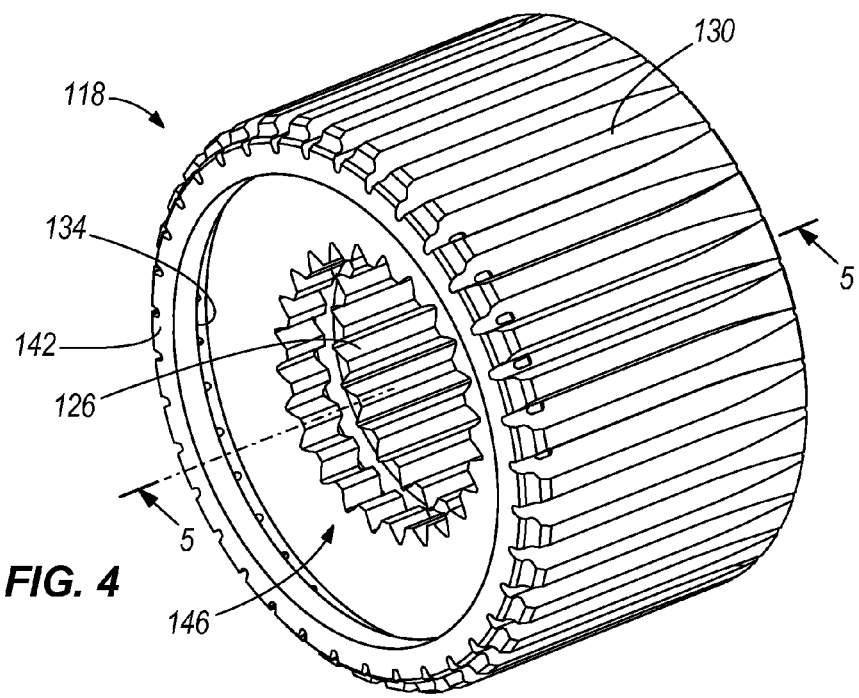
FIG. 4 illustrates a shaft extension of the compensator assembly shown in FIG. 2.

The shaft extension 118 of the compensator assembly 86 is coupled to the distal end 74 of the crankshaft 62 to rotate therewith. As shown in FIGS. 2 and 4, the shaft extension 118 includes an internal spline having one or more spline teeth 126 that engage the external spline teeth 78 of the crankshaft 62. The shaft extension 118 also includes an external spline having one or more spline teeth 130 that are configured to support the cam slider 114. More specifically, when assembled the exterior spline teeth 130 of the shaft extension 118 cause the cam slider 114 and the shaft extension 118 to rotate synchronously while allowing the cam slider 114 to move axially along the length of the shaft extension 118. During operation, the shaft extension 114 and the cam slider 114 rotate synchronously with the crankshaft 62.

Figure 5:
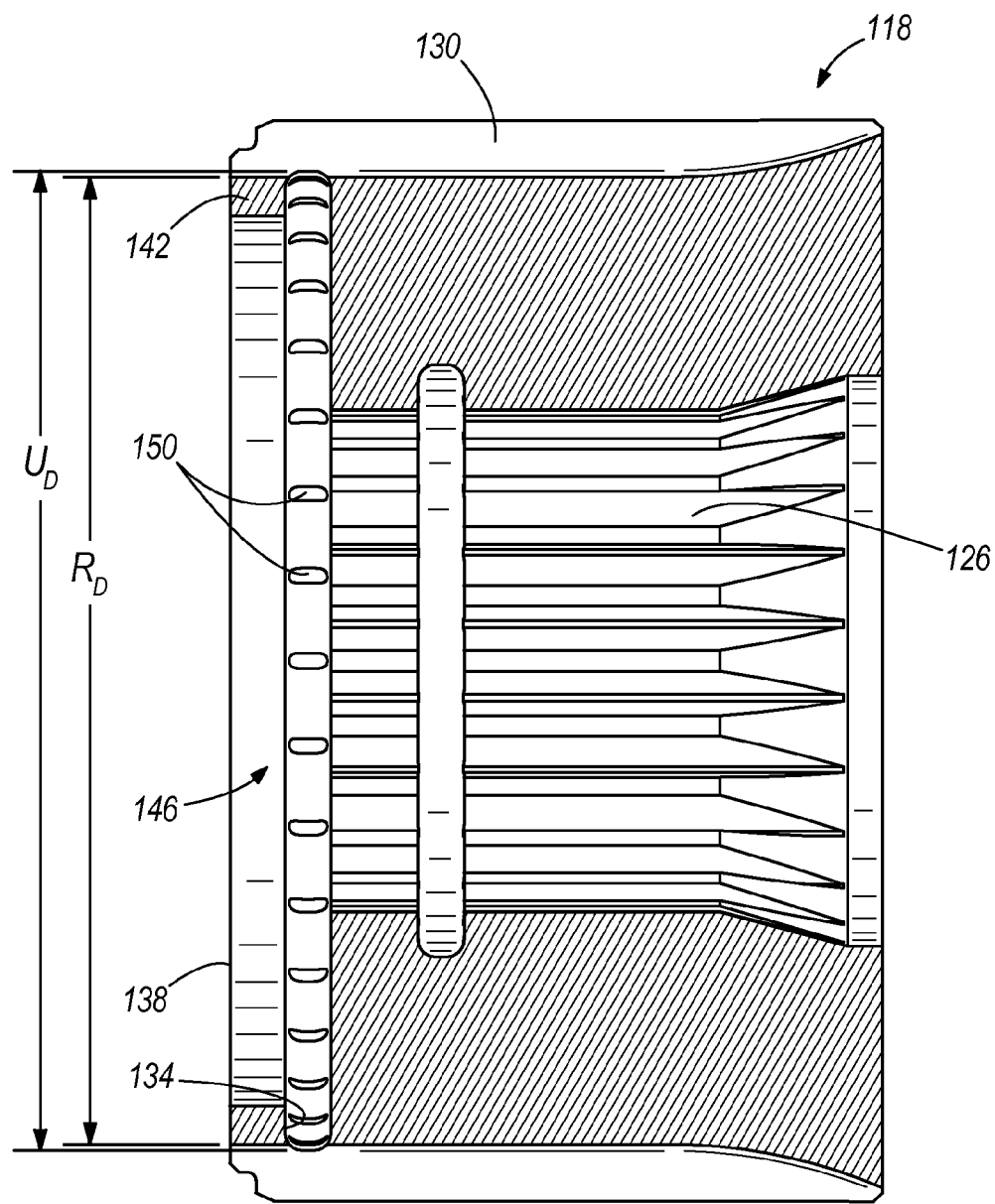
FIG. 5 is a section view taken along line 5-5 of FIG. 4.

The shaft extension 118 also includes an oil groove 134 formed proximate the first end 138 and at least partially defined by a lip 142 extending axially therefrom to form a pocket 146. The oil groove 134 is open on the radially inward side and extends along the periphery of the shaft extension 118 (FIG. 5). During use, the oil groove 134 collects oil and directs it between the external spline teeth 130 to lubricate the mutually sliding surfaces (e.g., interface) of the cam slider 114 and the shaft extension 118.

In the illustrated construction, the oil groove 134 is formed by cutting (e.g., boring) into the lip 142 in a radially outward direction to produce an outer groove diameter $U_D$ greater than the root diameter $R_D$ of the external spline teeth 130 (FIG. 5). As such, the oil groove 134 "breaks through" between each external spline tooth 130 forming an opening 150 for oil to pass. In the illustrated construction, the roots between each spline tooth 130 are cut deeper than normal to aid in producing the opening 150 and to facilitate oil distribution between the sliding surfaces, or interface, between the shaft extension 118 and the cam slider 114.

Figure 6:
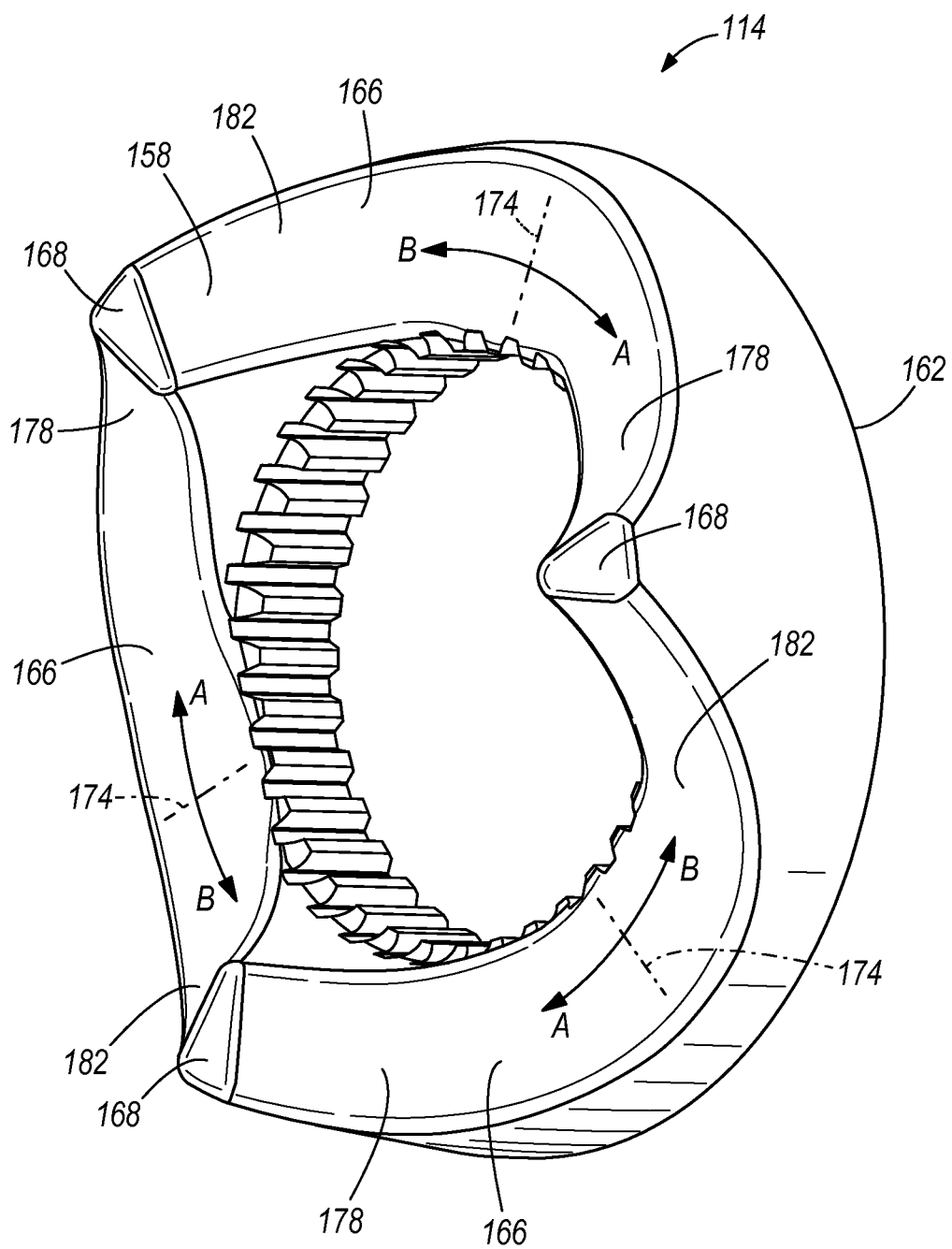
FIG. 6 illustrates a cam slider of the compensator assembly shown in FIG. 2.

Illustrated in FIG. 6, the cam slider 114 of the compensator assembly 86 is substantially annular in shape, forming internal spline teeth 154 configured to engage the exterior spline teeth 130 of the shaft extension 118 to form an interface therebetween. When assembled, the cam slider 114 is fixed for rotation with and axially moves along the shaft extension 118 in response to impulse loads in the drivetrain. More specifically, the cam slider 114 is biased by one or more biasing members or springs 152 towards the distal end 74 of the crankshaft 62 and into engagement with the sprocket 110.

The cam slider 114 also includes a cam surface 158 extending axially from a base surface 162 to produce varying heights along the circumference of the cam slider 114 (FIG. 6). When assembled, the cam surface 158 of the cam slider 114 engages the sprocket 110 to transmit torque therebetween. In the illustrated construction, the cam slider 114 includes three substantially similar cam elements 166, each corresponding to and in contact with a respective one of the spokes 170 of the sprocket 110 (described below). In alternate constructions, more or fewer cam elements 166 may be present as necessary.

During use, the spokes 170 of the sprocket 110 move along the cam surface 158 depending upon the direction and magnitude of the impulse loads between the engine 56 and the drivetrain. More specifically, the cam surface 158 of the cam slider 114 and the spokes 170 of the sprocket 110 form a torque-buffering interface therebetween.

When no impulse loads are being transmitted between the engine 56 and the drivetrain (e.g., during smooth acceleration, cruising, or idling) the spokes 170 contact the cam surface 158 at a neutral point 174, which roughly corresponds with the axially lowest point of each cam element 166. As such, the biasing members 152 bias the cam slider 114 towards the neutral point 174.

When a large forward impulse is experienced by the compensator assembly 86 (e.g., a sudden increase in crankshaft RPM), the spokes 170 of the sprocket 110 move along a first portion 178 of the cam surface 158 in direction A (FIG. 6), which in turn forces the cam slider 114 axially away from the distal end 74 of the crankshaft 62 and against the biasing members 152. The larger the impulse load, the further the spokes 170 travel along the first portion 178 of the cam surface 158 in direction A.

In contrast, a large rearward load (e.g., sudden decrease in engine RPM) causes the spokes 170 of the sprocket 110 to move in direction B along the second portion 182 of the cam surface 158, opposite direction A. Although the rearward load causes the spokes 170 to move in the opposite direction, the cam slider 114 is still forced axially away from the distal end 74 of the crankshaft 62 and into the biasing members 152. The larger the impulse, the further the spokes 70 will move along the second portion 182 of the cam surface 158 in direction B.

Illustrated in FIG. 6, adjacent cam elements 166 are separated by peaks 168 between the first portions 178 and second portions 182 of adjacent cam elements 166. In the illustrated construction, the contour of the first portion 178 is less steep than the contour of the second portion 182. In alternate constructions the contour of both the first and second portions 178, 182 may be altered as necessary to vary the operational characteristics of the compensator assembly 86.

Figure 7:
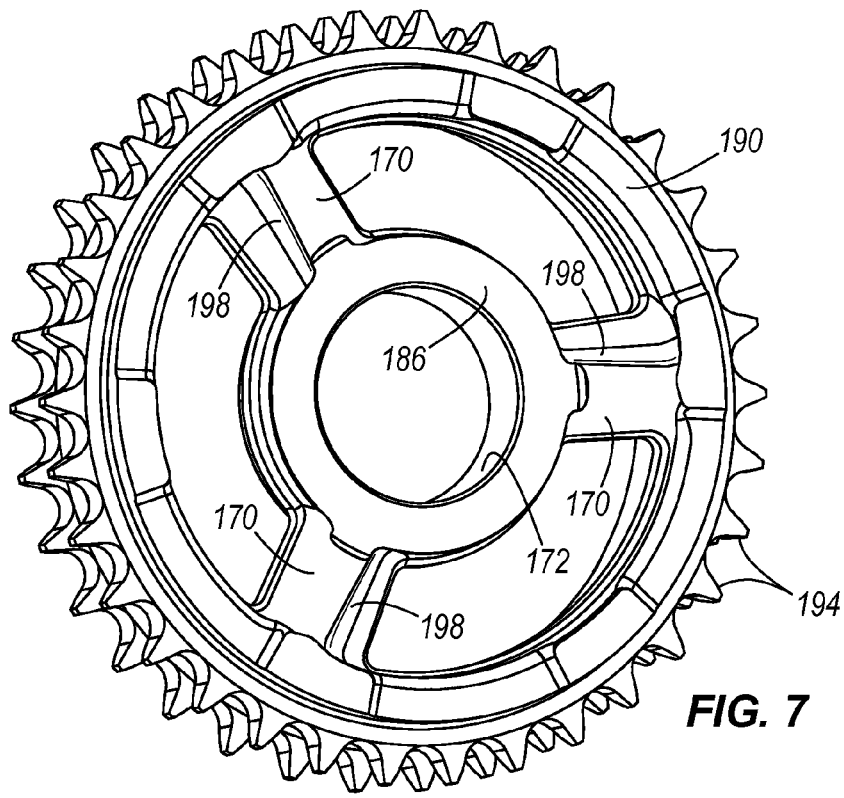
FIG. 7 is a perspective view of a sprocket of the compensator shown in FIG. 2.
Figure 8:
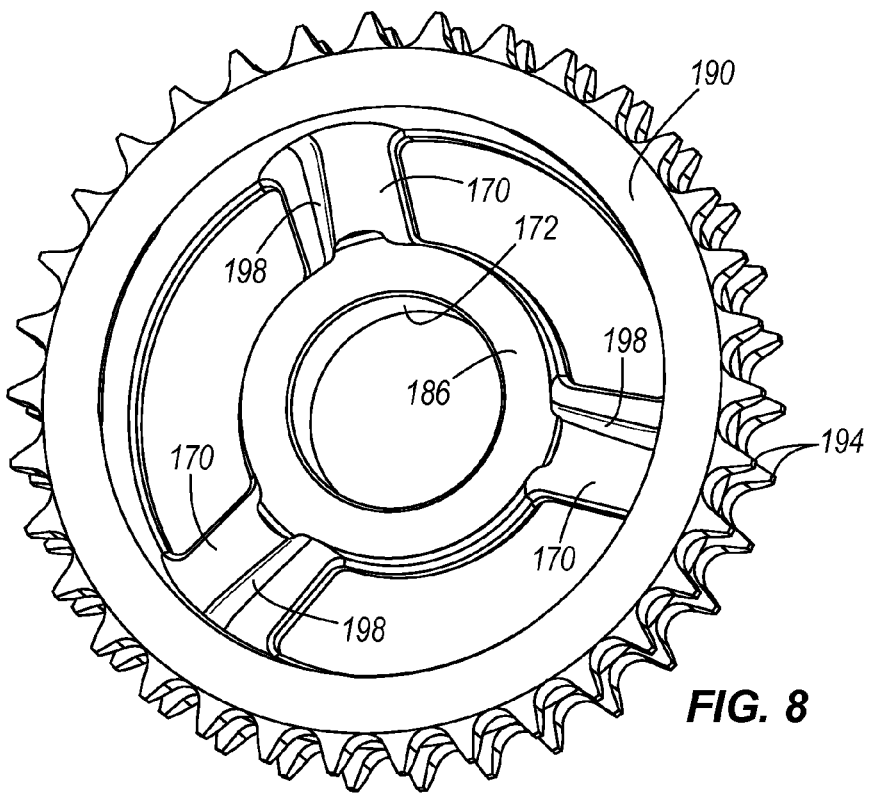
FIG. 8 is a rear perspective view of the sprocket shown in FIG. 7.

Illustrated in FIGS. 7 and 8, the sprocket 110 is substantially disk shaped, having an inner race 186, an outer race 190, and a plurality (e.g., three) of spokes 170 extending radially therebetween. The sprocket 110 also includes two axially-spaced rings of sprocket teeth 194 configured to engage a double-row chain (not shown) in mechanical communication with a clutch or other transmission input. However, in alternate constructions the outer race 190 may include provisions for a belt, drive gears, and the like. When assembled, the sprocket 110 is rotatably supported on a retainer 210 to form an interface therebetween.

During operation, the sprocket 110 is driven with torque compensation by the cam slider 114 by way of the cam surfaces 158 engaging the spokes 170. The sprocket 110 in turn is configured to drive the rear wheel 54 through the remainder of the drivetrain. The sprocket 110 is not internally splined, but rather includes a smooth bore 172 rotatably supported on the retainer 210 (FIG. 2). Therefore, the sprocket 110 is rotatable relative to the cam slider 114, the shaft extension 118, and the crankshaft 62 about the crankshaft axis 66 within a predetermined range.

The sprocket 110 also includes a plurality of lubrication channels 198 extending substantially radially along the spokes 170 (FIGS. 7 and 8). The channels 198 are sized to allow oil to infiltrate the interface between the cam surface 158 of the cam slider 114 and the spokes 170 to form a protective film. In the illustrated construction, each spoke 170 contains two channels 198 on opposite axial sides thereof substantially corresponding to the areas the cam surface 158 contacts the spokes 170. However, in alternate constructions more or fewer channels 198 may be present as necessary.

Figure 17:
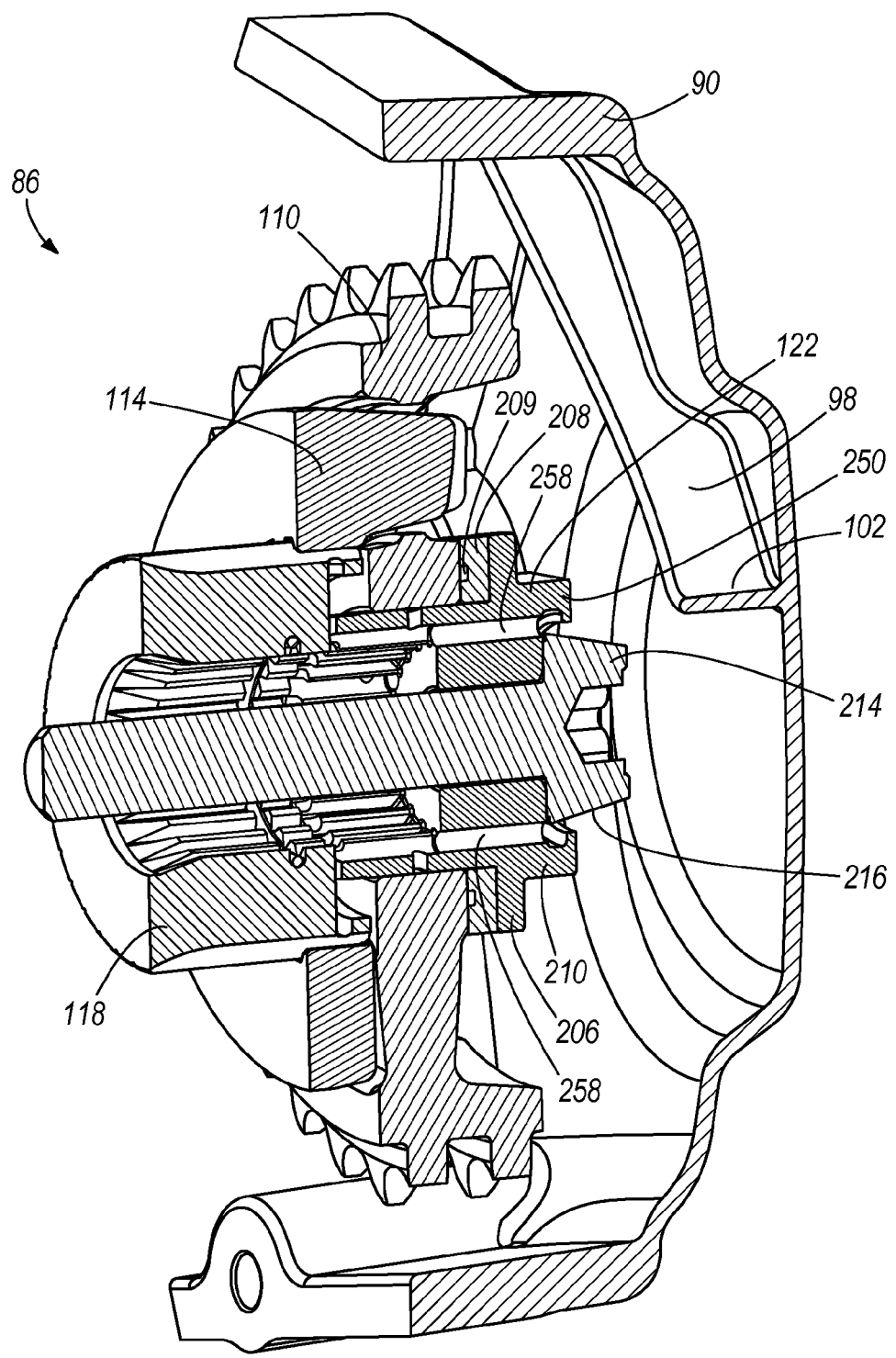
FIG. 17 is a section view taken along a crankshaft axis of another embodiment of a compensator assembly.

The sprocket 110 is axially constrained by a thrust bearing 202 positioned between the sprocket inner race 186 and a flange 206 of the retainer 210. During operation, the cam slider 114 is forced axially outwardly, towards the distal end 74 of the crankshaft 62 which in turn forces the sprocket 110 axially outwardly and into contact with the thrust bearing 202. In alternate constructions, a polymer thrust washer 208 with lubrication grooves 209 formed therein could be used (FIG. 17).

Figure 10:
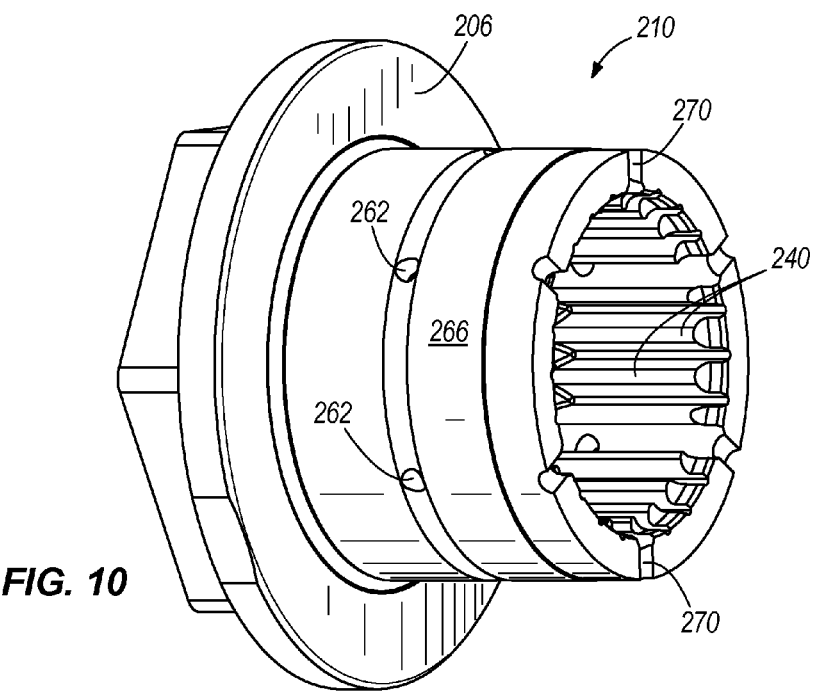
FIG. 10 is a rear perspective view of the sprocket retainer shown in FIG. 9.
Figure 11:
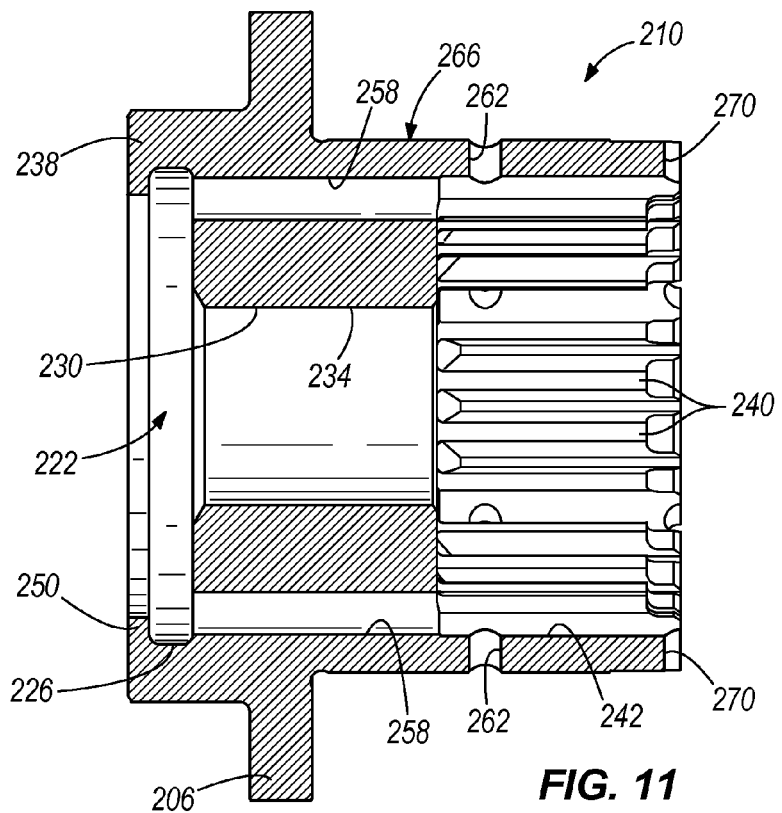
FIG. 11 is a section view taken along line 11-1 of FIG. 9.
Figure 12:
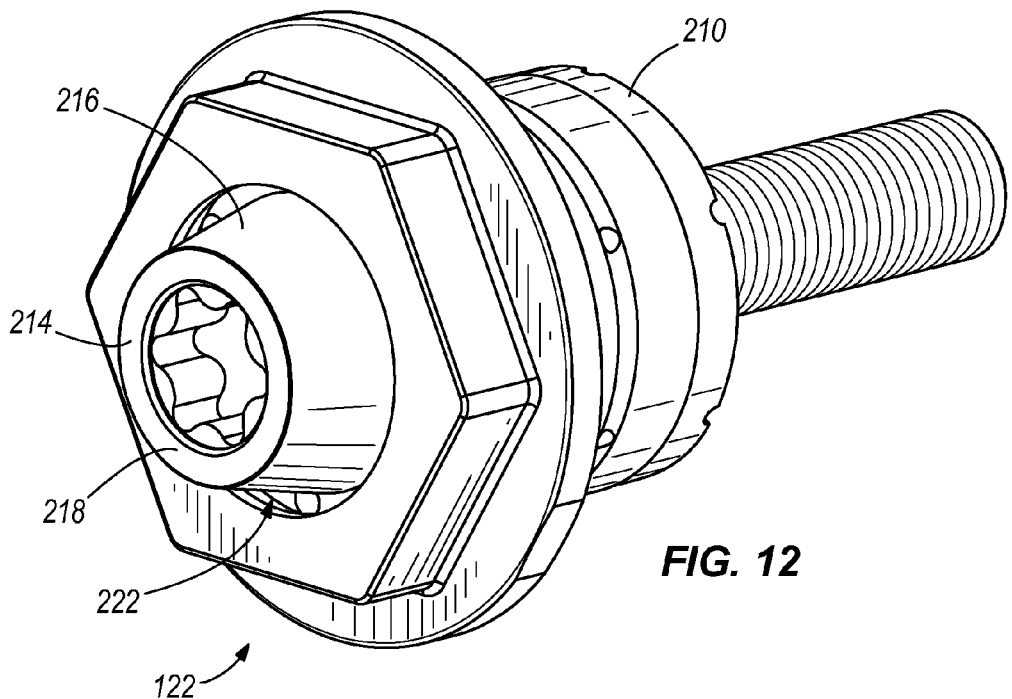
FIG. 12 illustrates a retention bolt nested in a pocket formed by the sprocket retainer shown in FIG. 9.

As shown in FIGS. 9-12, the compensator assembly 86 further includes a retention assembly 122 including the retainer 210, and a retainer bolt 214. The retainer assembly 122 is configured to axially retain the sprocket 110, cam slider 114, and shaft extension 118 on the distal end 74 of the crankshaft 62. In the illustrated construction, the retainer 210 is coupled to the distal end 74 of the crankshaft 62 by the retainer bolt 214 which in turn is threaded into a threaded aperture formed in the distal end 74 of the crankshaft 62. More specifically, the retainer bolt 214 includes a head 218 having a substantially conical outer surface 216 that expands radially outwardly as it extends axially inwardly, or towards the retainer 210 (FIGS. 2 and 12).

During use, the oil dripping from the apex 102 of the ribs 98 of the primary cover 90 lands on the conical outer surface 216 of the head 218 where centrifugal force from the rotation of the compensator assembly 86 urges the oil axially inward towards the retainer 210 and into a pocket 222 formed at an axially distal end 238 thereof. In the illustrated construction, the conical outer surface 216 of the head 218 is smooth to assure the maximum amount of fluid is directed toward the retainer 210 and not flung off as the compensator assembly 86 rotates with the crankshaft 62. When assembled, incident oil moves axially inwardly along the outer surface 216 of the bolt head 218 until it reaches the innermost point, where it is flung off and is captured by an oil groove 226 of the retainer 210 (described below). The oil is then directed by the retainer 210 to one or more interfaces throughout the compensator assembly 86.

Figure 9:
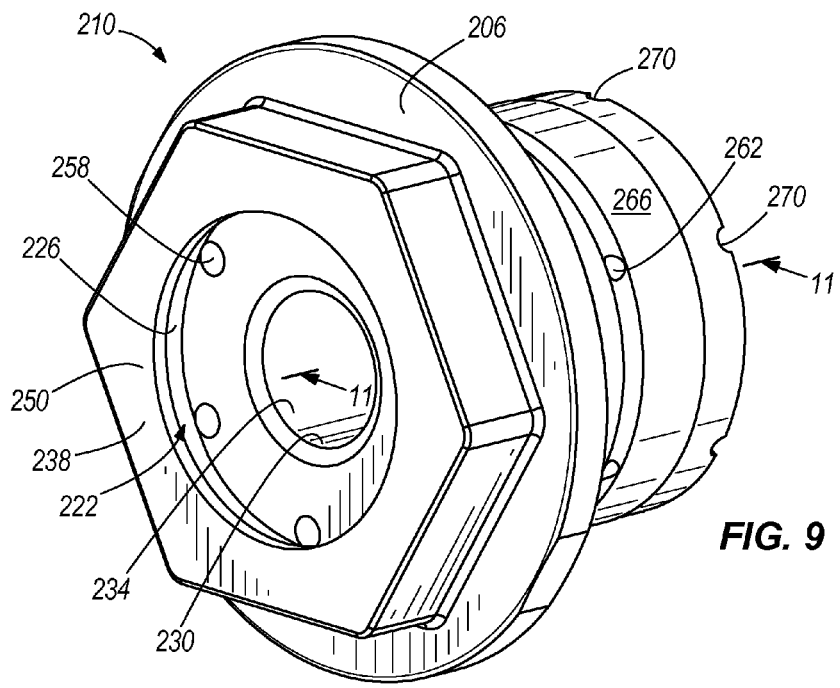
FIG. 9 is a perspective view of a sprocket retainer of the compensator assembly shown in FIG. 2.

Illustrated in FIGS. 9-11, the retainer 210 of the compensator assembly 86 is substantially cylindrical in shape having a central bore 230 extending therethrough. The central bore 230 of the retainer 210 includes a first portion 234 proximate the distal end 238, and a second portion 242 extending axially from the first portion 234 away from the distal end 238 to define a plurality of interior spline teeth 240. When assembled, the interior spline teeth of the second portion 242 engage the exterior spline teeth 78 of the crankshaft 62 causing the crankshaft 62 and the retainer 210 to rotate as a unit. Furthermore, the retainer 210 is coupled on the distal end 74 of the crankshaft 62 by the retainer bolt 214.

The retainer 210 also defines an oil groove 226 positioned proximate the distal end 238 of the retainer 210. The oil groove 226 is open on the radially inwardmost side and is at least partially defined by a lip 250 extending axially from the retainer's distal end 238. The lip 250 also at least partially defines a pocket 222.

The retainer 210 also defines a plurality (e.g., six) of lubrication passageways 258 extending axially through the retainer 210 and positioned radially outwardly of the first portion 234 of the bore 230. In the illustrated construction, the passages 258 extend between the distal end 238 of the retainer 210 and one or more of the interfaces of the compensator assembly 86. More specifically, each passageway 258 is in fluid communication with the pocket 222 and some combination of the interfaces formed between the sprocket 110, the retainer 210, the shaft extension 118, and the cam slider 114. In the illustrated construction, the distal end of the lip 250 is positioned radially inward of the radially outermost point of the lubrication passages 258 (FIG. 11).

The retainer 210 also includes a first set of apertures 262, each positioned a first axial distance from the distal end 238 and extending between the outer surface 266 of the retainer 210 and a corresponding one of the passageways 258. The first set of radial apertures 262 are positioned proximate the flange 206 and are in fluid communication with the interface formed between the bore 172 in the inner race 186 of the sprocket 110 and the outer surface 266 of the retainer 210.

The retainer 210 also includes a second set of radial apertures 270, each positioned a second axial distance from the distal end 238 greater than the first distance. More specifically, the second set of radial apertures 270 are open to the axially inward end of the retainer 210. The second set of radial apertures 270 extend between the outer surface 266 of the retainer 210 and a corresponding one of the passageways 258. When assembled, the radially inward end of the retainer 210 is received within the pocket 146 of the shaft extension 118 causing each of the second set of apertures 270 to be substantially axially aligned with the oil groove 134. As such, centrifugal force caused by rotation of the compensator assembly 86 forces oil through the second set of apertures 270 and radially outwardly to be collected by the oil groove 134 which in turn distributes the oil as described above.

During operation, oil is collected by the compensator assembly 86 from within the primary cover 90 to be distributed to various interfaces within the assembly. More specifically, splash oil is collected by the ribs 98 of the primary cover 90 where the oil is funneled towards the apex 102. The oil then drips from the apex 102 onto the conically shaped outer surface 216 of the head 218 of the retaining bolt 214. The oil then proceeds axially inwardly and radially outwardly along the conical surface 216 until it is radially thrown off and collected by the oil groove 226 of the retainer 210.

Once collected in the oil groove 226, the oil enters the plurality of axial passageways 258 and continues axially inwardly via the rotation of the compensator 86. As the oil continues inwardly, a first portion of the oil is expelled out the first set of apertures 262 to lubricate the interface formed between the bore 172 of the sprocket 110 and the retainer 210 (hereafter Interface W).

The remainder of the oil continues axially inwardly until it reaches the second set of apertures 270. The oil is then thrown off radially and collected by the oil groove 134 of the shaft extension 118. The oil within the oil groove 134 is then directed through the plurality of openings 150 to lubricate the exterior splines 130 (e.g., the interface formed between the cam slider 114 and the shaft extension 118; hereafter Interface X).

As oil continues to build at interface W, excess oil will begin to leak and continue radially outwardly due to the rotation of the compensator assembly 86. More specifically, oil leaking from interface W continues radially outwardly to lubricate the thrust bearing 202 (hereafter interface Y) and along the channels 198 in the spokes 110 to lubricate the contacting point between the cam surface 158 and the spokes 170 (hereafter Interface Z, not shown).

In summary, the compensator assembly 86 of the present invention provides full lubrication to all the interfaces within the assembly without the use of a pump. Rather, the compensator assembly 86 includes a passive lubrication system that harnesses the centrifugal force generated by the rotation of the compensator assembly 86 with the crankshaft 62 to collect and distribute oil to the one or more interfaces.

FIGS. 13-16 illustrate a second embodiment of the compensator assembly 86' for use with a wide-body motorcycle. The compensator assembly 86' is substantially similar to and operates in much the same way as the compensator assembly 86 described above. As such, similar elements have been given the same number with an added prime. Only the differences between the two constructions will be described herein.

Figure 13:
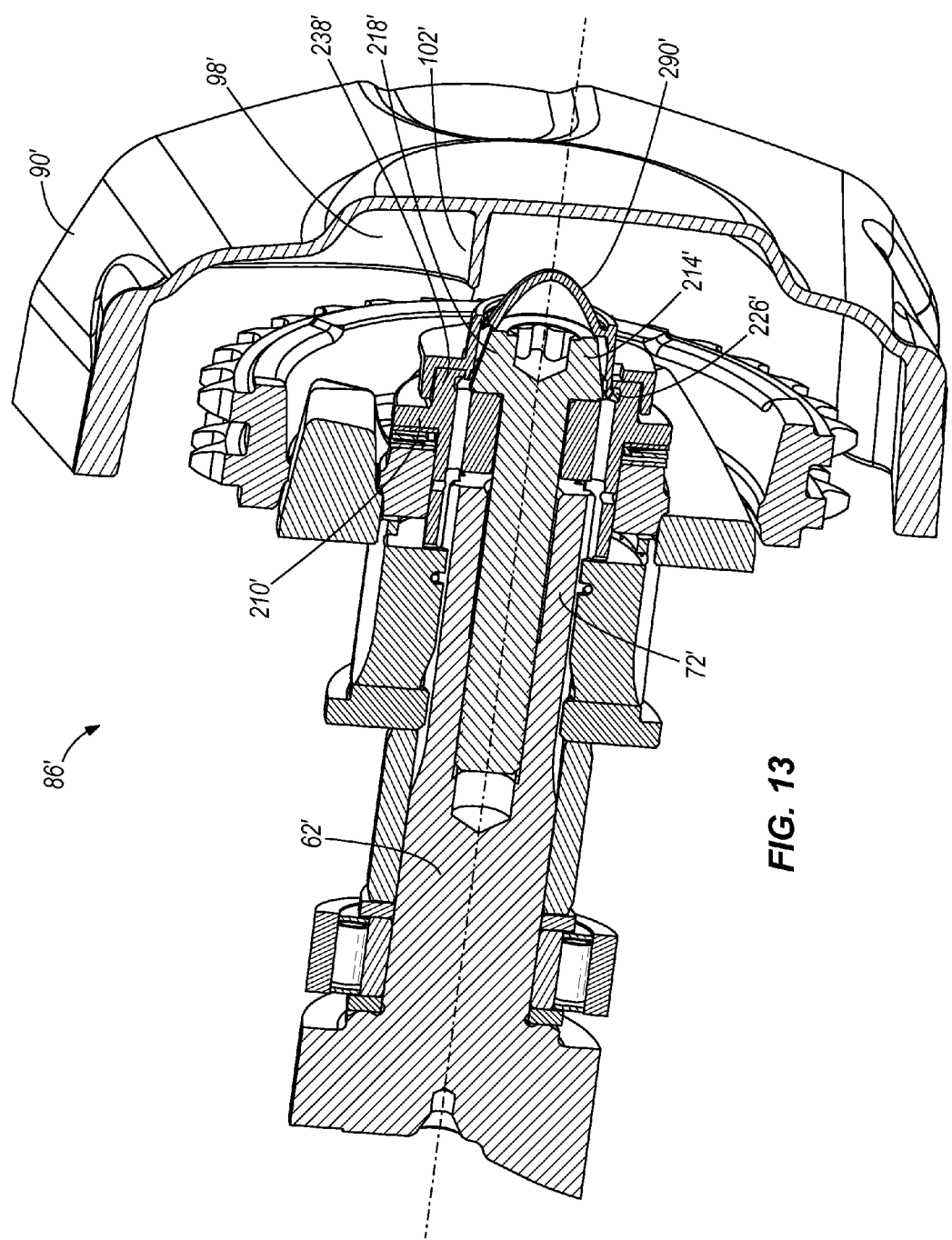
FIG. 13 is a section view taken along a crankshaft axis of another embodiment of a compensator assembly.

Illustrated in FIG. 13, the primary cover 90' of the compensator assembly 86' is positioned a greater distance from the distal end 72' of the crankshaft 62' (as compared with compensator assembly 86). To ensure oil dripping from the apex 102' of the ribs 98' is directed into the oil groove 226', a cap 290' is coupled to the distal end 238' of the retainer 210'.

Figure 14:
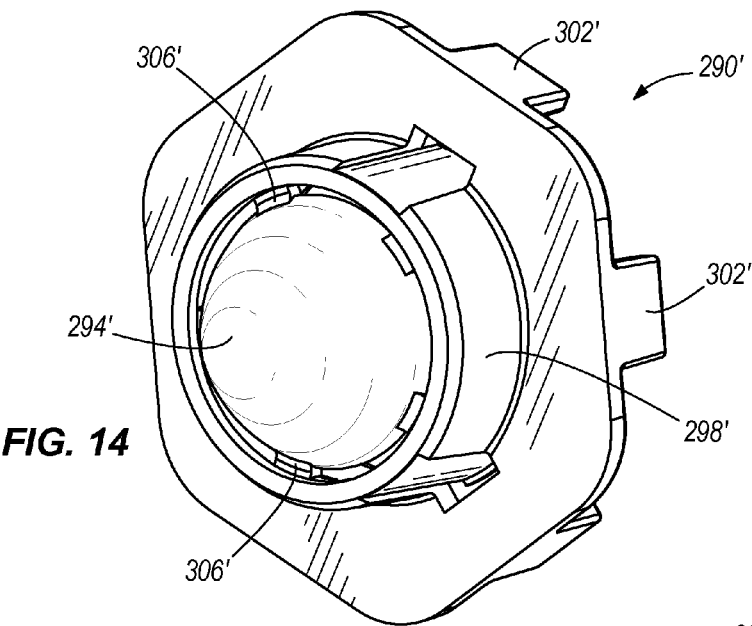
FIG. 14 is a perspective view of a cap used in the compensator assembly shown in FIG. 13.
Figure 15:
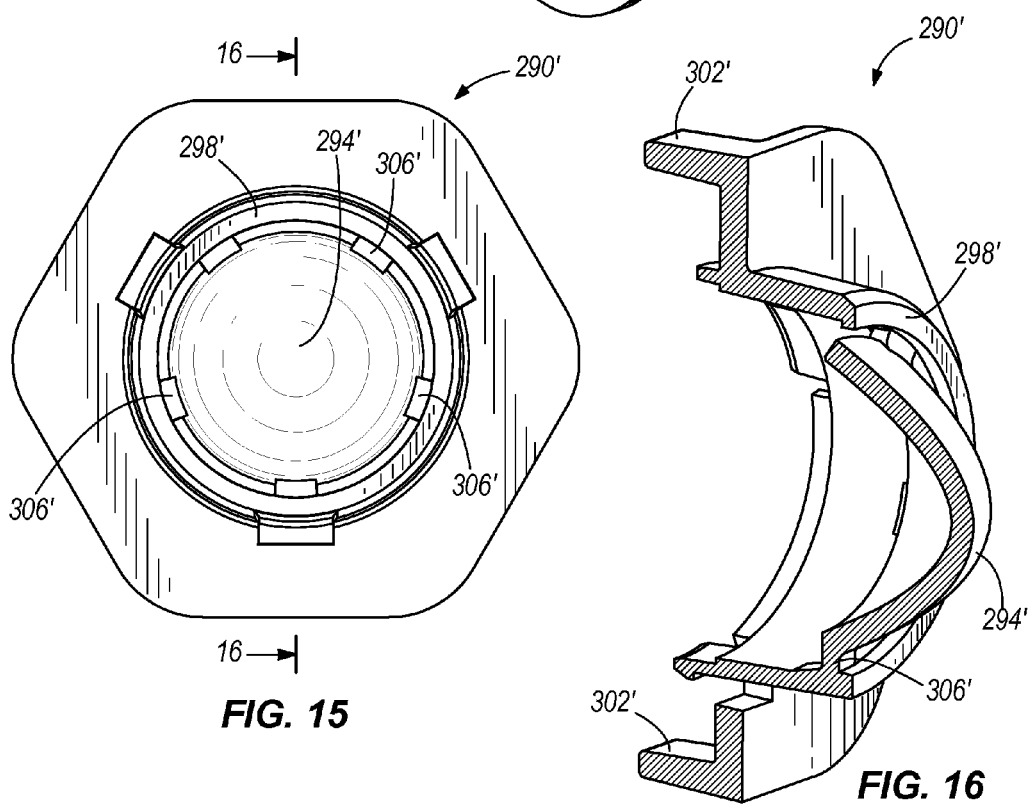
FIG. 15 is a front view of the cap shown in FIG. 14.
Figure 16:
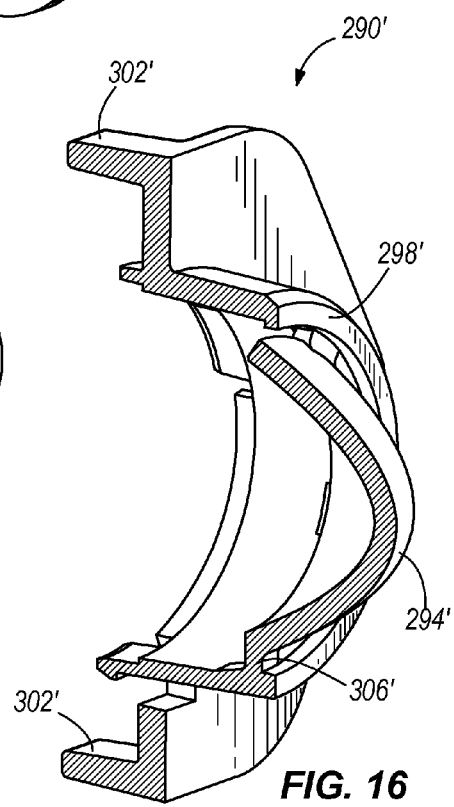
FIG. 16 is a section view taken along line 16-16 of FIG. 15.

Illustrated in FIG. 14-16, the cap 290' is removably coupled to the distal end 238' of the retainer 210' to extend the axial "reach" of the compensator assembly 86' for gathering oil from the primary cover 90'. The cap 290' is generally hexagonal in shape, having a convex tip 294', an annular sheath 298', and a plurality of tabs 302'. In the illustrated construction, the tabs 302' are configured to snap fit onto the distal end 238' of the retainer 210', allowing for easy removal and access to the retention bolt 214'.

Similar to the conical outer surface of the bolt head 218', the convex tip 294' expands radially as it extends axially inwardly. As such, oil dripped onto the cap 290' (e.g., via the apex 102') will be urged axially inwardly by centrifugal force towards the retainer 210' as the compensator 86' rotates. The outer surface of the convex tip 294' is substantially smooth to maximize the amount of oil conveyed to the retainer 210'.

The sheath 298' of the cap 290' at least partially encompasses a portion of the tip 294', positioned radially outwardly leaving a gap therebetween for oil to pass. The sheath 298' at least partially overlaps a portion of the tip 294' and is coupled thereto by a plurality of supports 306' extending therebetween. The sheath 298' captures excess oil that may have been discharged from the tip 294' during use.

During use, oil is deposited on the tip 294' of the cap 290', where it travels axially inwardly until it is deposited within the pocket 222'. Once within the pocket 222', the oil distribution is similar to that described above.

Various features and advantages of the invention are set forth in the following claims.

The invention claimed is:

1. A motorcycle comprising:
a frame;
a rear wheel rotatably coupled to the frame;
an engine supported by the frame and configured to drive the rear wheel, the engine having a crankshaft; and
a compensator assembly coupled between the crankshaft and the rear wheel and configured to dampen impulse loads between the crankshaft and the rear wheel, the compensator assembly having,
a shaft extension rotatably fixed with respect to the crankshaft,
an input member rotatably fixed and axially slideable with respect to the shaft extension, the shaft extension and input member forming a first interface therebetween,
an output member driven by the input member with a torque-buffering interface, and
a retainer rotatably fixed to the crankshaft and configured to axially retain the input member and the output member thereto, the retainer and output member being rotatably coupled to one another forming a second interface therebetween, and wherein the retainer includes a passageway extending between a distal end of the retainer and at least one of the first interface and the second interface.

2. The motorcycle of claim 1, further comprising a cover at least partially enclosing the compensator assembly and containing a first quantity of lubricant therein.

3. The motorcycle of claim 2, wherein the cover includes at least one rib configured to direct lubricant onto the compensator assembly.

4. The motorcycle of claim 2, wherein the cover includes a plurality of ribs forming a "V" shape and having an apex, and wherein the apex is vertically aligned with the crankshaft axis.

5. The motorcycle of claim 1, wherein the distal end of the retainer defines a pocket, and wherein the passageway is in fluid communication with the pocket.

6. The motorcycle of claim 5, wherein the compensator assembly is coupled to the crankshaft by a retention bolt, and wherein the head of the retention bolt has a conical outer surface.

7. The motorcycle of claim 6, wherein the conical outer surface is at least partially nested within the pocket.

8. The motorcycle of claim 5, wherein the pocket includes an oil groove open on the radially inward side and extending along a periphery of the retainer.

9. The motorcycle of claim 1, wherein the input member includes a cam surface in contact with the output member.

10. The motorcycle of claim 1, further comprising a cap coupled to the distal end of the retainer having a convex outer surface.

11. The motorcycle of claim 10, wherein the cap includes an annular sheath spaced radially outwardly from and at least partially encompassing a portion of the outer, convex surface.

12. The motorcycle of claim 1, wherein the output member comprises a sprocket.

13. A compensator assembly for transmitting torque along a drivetrain, the drivetrain having at least one shaft therein, the compensator assembly comprising:
an input member rotationally fixed to and axially moveable with respect to the shaft along a first interface;
an output member driven by the input member with a torque-buffering interface; and
a retainer mounted to the shaft and configured to retain the input member and output member thereto, the retainer and output member being rotatably coupled to one another to form a second interface therebetween, and wherein the retainer defines at least one passageway extending between a distal end of the retainer and at least one of the first interface and the second interface.

14. The compensator assembly of claim 13, wherein the distal end of the retainer defines a pocket, and wherein the at least one passageway is in fluid communication with the pocket.

15. The compensator assembly of claim 14, further comprising a retention bolt having a head portion with a conically shaped outer surface that expands radially outwardly as it extends axially inwardly toward the retainer, and wherein at least a portion of the conically shaped outer surface is positioned within the pocket.

16. The compensator assembly of claim 14, wherein the pocket includes an oil groove extending along the periphery thereof, and wherein the oil groove is open on the radially inward side.

17. The compensator assembly of claim 13, further comprising a retention bolt having a head portion with a conically shaped outer surface.

18. The compensator assembly of claim 13, further comprising a cap coupled to the distal end of the retainer having a convex outer surface.

19. The compensator assembly of claim 18, wherein the cap includes a sheath spaced radially outwardly from and at least partially encompassing a portion of the convex outer surface.

20. The compensator assembly of claim 13, further comprising a shaft extension having a set of inner splines to engage the shaft and a set of exterior splines to engage the input member.

21. The compensator assembly of claim 20, wherein the input member contacts the exterior splines to form the first interface therebetween.

22. The compensator assembly of claim 20, wherein the exterior splines of the shaft extension define a root diameter, and wherein the shaft extension also includes an oil groove proximate one end having an outer diameter greater than the root diameter.

23. The compensator assembly of claim 13, wherein the output member comprises a sprocket having one or more radially extending spokes, and wherein each spoke includes an oil groove formed therein.

24. The compensator assembly of claim 23, wherein each oil groove extends radially along a respective spoke.

25. The compensator assembly of claim 13, wherein the shaft comprises a crankshaft.

26. A motorcycle comprising:
a frame;
a rear wheel rotatably coupled to the frame;
an engine supported by the frame and configured to drive the rear wheel, the engine having a crankshaft defining a crankshaft axis;
a compensator assembly to dampen impulse loads between the crankshaft and the rear wheel, the compensator assembly having,
a shaft extension rotatably fixed with respect to the crankshaft,
an input member rotatably fixed and axially slideable with respect to the shaft extension, the shaft extension and input member forming a first interface therebetween,
an output member driven by the input member with a torque-buffering interface,
a retainer rotatably fixed to the crankshaft, the retainer and output member being rotatably coupled to one another forming a second interface therebetween, wherein a distal end of the retainer defines a pocket, and wherein the retainer includes a passageway extending and in fluid communication with the pocket and at least one of the first interface and the second interface, and
a retention bolt coupling the retainer to the crankshaft, the retention bolt having a head portion with a substantially conical outer surface, and wherein at least a portion of the conical outer surface is positioned within the pocket; and
a cover at least partially encompassing the compensator assembly therein, the cover having a plurality of ribs forming an apex that is vertically aligned with the crankshaft axis.

* * * * *